June 10, 1924.

O. HERMANN

COMBINATION LOCK FOR AUTOMOBILES

Filed July 20, 1921  2 Sheets-Sheet 1

1,496,846

INVENTOR,
Otto Hermann,
BY
Harry W. Bowen.
ATTORNEY.

June 10, 1924.
O. HERMANN
COMBINATION LOCK FOR AUTOMOBILES
Filed July 20, 1921  2 Sheets-Sheet 2
1,496,846
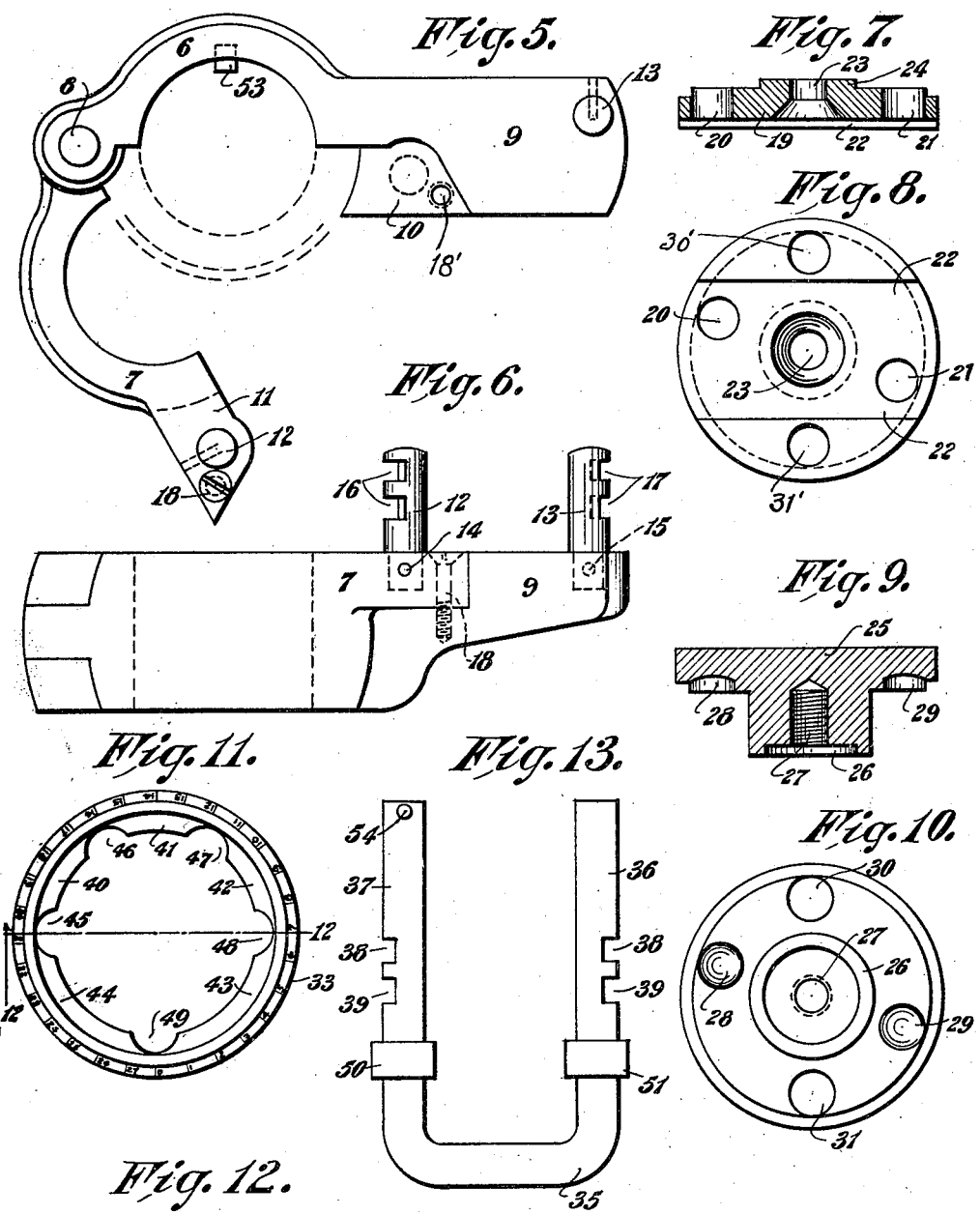
INVENTOR,
Otto Hermann,
BY
ATTORNEY.

Patented June 10, 1924.

1,496,846

UNITED STATES PATENT OFFICE.

OTTO HERMANN, OF SPRINGFIELD, MASSACHUSETTS, ASSIGNOR TO RELIABLE COMBINATION LOCK CORPORATION, OF WASHINGTON, DISTRICT OF COLUMBIA, A CORPORATION OF THE DISTRICT OF COLUMBIA.

COMBINATION LOCK FOR AUTOMOBILES.

Application filed July 20, 1921. Serial No. 486,014.

*To all whom it may concern:*

Be it known that I, OTTO HERMANN, a citizen of the United States of America, residing at Springfield, in the county of Hampden and Commonwealth of Massachusetts, have invented certain new and useful Improvements in Combination Locks for Automobiles, of which the following is a specification.

This invention relates to improvements in devices for locking the steering wheel of an automobile or motor vehicle so that it cannot be operated or turned by an unauthorized person.

Broadly it comprises a clamp designed to be secured to the steering post of the wheel, and a combination locking device for retaining the locking bolt which engages one of the spokes of the wheel in place.

A further object is to provide a wheel locking device in which all of the operative parts are concealed, and cannot be removed without operating the combination locking device and also one which cannot be detached from the steering post without operating the combination.

Referring to the drawings:

Fig. 5 is a plan view of the post clamping device in open position and before the clamp is applied.

Fig. 6 is a side elevational view of Fig. 5 after the clamp is closed and before the lock is placed thereon.

Fig. 7 is a detail sectional view of the lower plate of the lock which fits onto the arm of the clamp.

Fig. 8 is a bottom plan view of the lower plate shown in Fig. 7, and the openings for receiving the posts and locking bolt.

Fig. 9 is a detail sectional view of the upper plate of the lock.

Fig. 10 is a bottom plan view of Fig. 9.

Fig. 11 is a plan view of one of the combination rings.

Fig. 12 is a vertical sectional view on the line 12—12 of Fig. 11.

Fig. 13 is a detail view of the U-shaped locking bolt.

Figure 1:
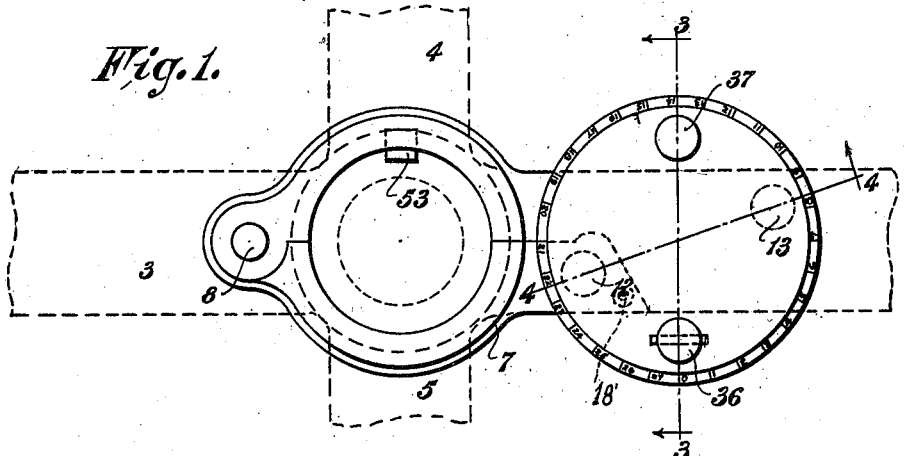
Fig. 1 is a plan view showing the device attached to the steering post of the machine and illustrating the upper graduated locking ring and the upper ends of the locking bolt in full lines, and in dotted line the posts for securing the device to the clamp.

Referring to the drawings in detail: 1 designates the usual steering post, and 2, 3, 4 and 5, the spokes of the steering wheel. Attached to the steering post is the clamp composed of the members 6 and 7, which are pivoted together at 8. The member 6 is formed with an extension or arm portion 9, having a recessed portion 10 which receives the end 11 of the hinged part 7. Attached to and secured in the parts 9 and 11 are the grooved posts 12 and 13, by means of the pins 14 and 15. The grooves are indicated at 16 and 17. The part 7 is secured to the part 9 by means of the screw 18 entering the opening 18'.

Referring to the construction of the lock proper: 19 designates the lower plate of the lock which is formed with the openings 20 and 21, and also with the grooved channel 22 on the bottom thereof and the opening 23 in the center. 24 is a circular hub or rib on the upper surface of the same. This bottom plate is placed on the arms 9 and 11 of the clamp when closed, by passing the posts 12 and 13 through the openings 20, 21. The channel 22 then engages the opposite sides of the arms 7 and 9, as shown in the assembled view in Figs. 3 and 4.

The upper plate of the lock is indicated in Figs. 9 and 10, at 25. This plate is formed with an annular recess 26, the threaded opening 27, the recesses 28 and 29 in the under side of the same, and with the openings 30 and 31. The upper and lower plates are shown assembled in Figs. 3 and 4, in section where the hub or rib 24 enters the recess 26. Before the plates are assembled the screw 32 is inserted to secure the upper and lower plates rigidly together. The openings 20 receive the posts 12 and 13, as already stated, and the recesses 28 and 29 receive the upper ends of these posts. It should be stated that before the upper and lower plates 19 and 25 are assembled, the combination locking rings 33 and 34 are put in place, as well as the wheel locking bolt 35 which is formed with the grooves 38 and 39. It is, of course, understood that before the posts 12 and 13, and the locking bolt 35 can be inserted that the recesses in the combination locking rings shall register with the grooves 16, 17, 38, and 39 to permit their insertion. One of the combination rings is shown in Fig. 11 detached from the lock, and illustrates the locking ribs which consist of the short arcs 40, 41, 42, 43, and 44, and the semicircular recessed portions 45, 46, 47, 48, and 49, as shown in Fig. 11. It should be noticed that the recesses 45 and 48 are oppositely located, or 180° apart, that the recesses 45 and 49, and 48 and 49 are 90° apart, and the recesses 45 and 46, 46 and 47, and 47 and 48 are 60° apart. The recesses 45 and 48 are the only ones that are used for the purpose of locking and unlocking the bolt 35, and the posts 12 and 13, the others are merely blind or deceptive recesses. It is understood that the upper and lower combination rings 33 and 34 are exactly like the one shown in Fig. 11. The upper ring, as indicated, is graduated into 27 equal divisions and the lower ring is shown graduated into a like number of spaces. In practice, any number of graduations may be made, and the rings need not necessarily have the same number of graduations. It is understood that the graduations may be located at any desired portion of the rings, and also that the upper and lower rings should have the numerals spaced differently, with relation to the recesses 45 and 48. Therefore the bolt 35 cannot be removed or slid into locking position until the rings are turned so that the recesses 45 and 48 are opposite the grooves 38 and 39. In other words, the locking rings must be so positioned that the locking arcs 40 to 44 are withdrawn from the grooves 38 and 39. The bolt 35 is formed with two collars 50 and 51 for limiting the upward movement of the same when it is placed in locking position.

Figure 2:
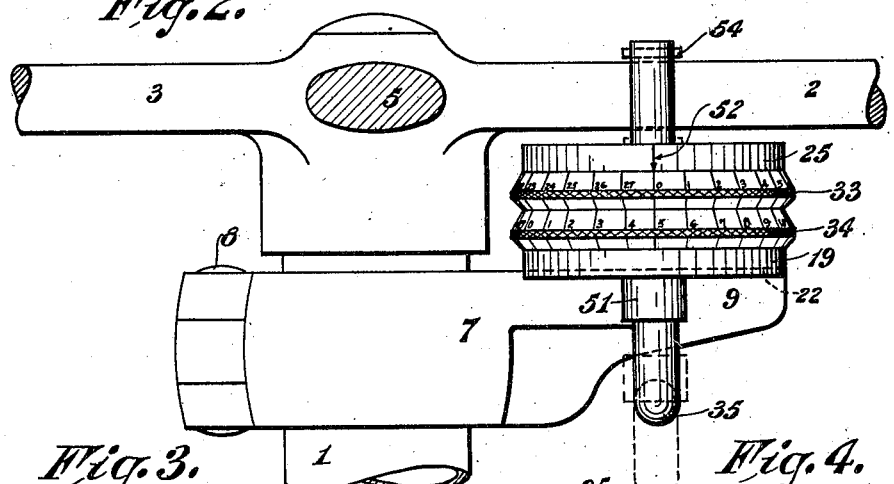
Fig. 2 is a side elevational view of Fig. 1 showing the locking bolt engaging one of the spokes of the steering wheel.
Figure 3:
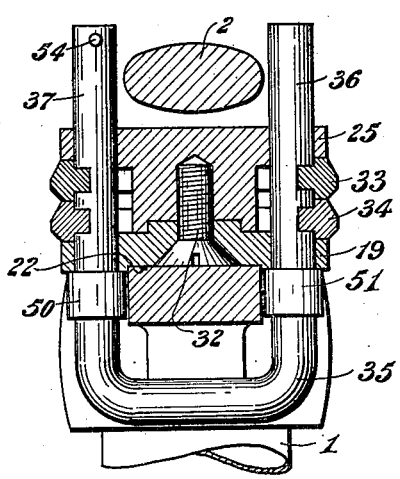
Fig. 3 is a vertical sectional view on the line 3—3 of Fig. 1, showing the spoke in section and the locking bolt on opposite sides of the same, and the locking rings in operative position.
Figure 4:
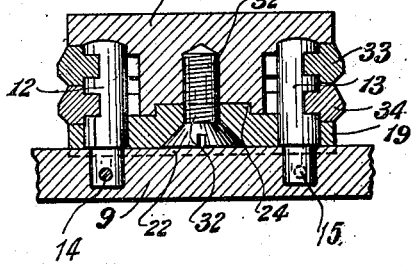
Fig. 4 is a vertical sectional view on the line 4—4 of Fig. 1 showing the posts on the clamp for retaining the locking device on the clamp, also the combination or locking rings in section and in engagement with the posts.

Referring now to the operation of the locking mechanism: 52 indicates an index line on the upper plate 25 (see Fig. 2). In the position shown the upper ring is registering with the line 52 substantially opposite the zero graduation of this ring, and the lower ring 34 is shown with the graduation 5 in registration with the index 52. This indicates that the recesses 45 and 48 permit the bolt 35 to slide or be withdrawn for unlocking the steering wheel or for pushing the bolt upward for locking the steering wheel. The locking position is indicated in Fig. 3 after the rings 33 and 34 have been turned in either direction away from the index 52, the arcs 40 to 44 have again entered the grooves 38 and 39, and the bolt 35 is again locked.

If it is desired to remove the lock from the clamping arm 9, or in other words, turn the rings 33 and 35 so that the locking arcs 40 to 44 are withdrawn from the grooves 16 and 17 of the posts 12 and 13, the same index line 52 is used for reference, but different graduations of the rings 33 and 34 will be used and brought into registration with the index line 52. This is obvious, from the position of the posts 12 and 13, shown in Fig. 2. The whole lock can now be removed from the arm 9.

An important feature of my invention is the concealing of the screw 18 when the parts are assembled or located on the arm 9, and also the holding of the clamp together by means of the groove 22 which engages the sides of the arm 9 and the movable part 7, thereby rendering the lock incapable of being moved from the steering post, unless one is familiar with the combination of the rings 33 and 34.

53 indicates a pin in the arm 9 which enters a small opening in the steering post, thereby preventing the clamp from being turned or moved out of position on the steering post. 54 designates a pin on one of the arms of the bolt 35 to prevent its dropping out of place when not in use.

It will be seen from this description that I have provided a lock for retaining the steering wheel of a motor vehicle in inoperative position, and one which is capable of various changes in the graduation of the locking rings, whereby no two locks need be made to operate by the same combination, as is readily understood.

What I claim is:

1. A locking device for the steering wheel of a motor vehicle, comprising in combination with the steering post of the wheel, of an arm adapted for attachment to the post, posts on the arm, upper and lower plates formed with openings and recesses to receive the posts, a sliding and locking bolt in the openings, and means engaging the posts and bolt for locking them to the plates.

2. In a locking device for the steering wheel of a motor vehicle, including a slidable bolt, substantially U-shaped, for engaging the opposite sides of a spoke of the wheel, said bolt having a plurality of grooves, graduated rings formed with recesses and arc-shaped ribs between the recesses for engaging the grooves of the bolt, whereby when the rings are moved into different positions the bolt may be either locked or unlocked, as described.

3. In a locking device for the purpose described, the combination, of a clamping member adapted to be attached to the steering post, means for securing the same thereto, including a swinging arm, means for retaining the arm in closed position, said means including a plate formed with openings, and a groove to engage the sides of the arm, posts formed with grooves and secured in the arms and passing through the openings in the plate, means for locking the plate to the posts, including a plurality of graduated rings formed with arc shaped ribs for engaging the grooves in the post, as described.

4. In a locking device, the combination with a clamping member or supporting arm adapted to be attached to the steering post of a motor vehicle, of upper and lower plates, means for securing the same together, posts secured to the supporting arm and extending through the lower plate, a slidable bolt passing through the plates, and means engaging the post and bolt for locking the same to the plates for the purpose described.

5. A locking device for the steering wheel of a motor vehicle, comprising a single arm adapted to be positioned on and attached to the steering post, means for retaining the arm on said post, including a plate to engage the arm, means having grooves carried by the plate for engaging a spoke of the wheel, means for locking the spoke engaging means, said means including a plurality of graduated rings formed with arc-shaped ribs which may be rotated on the plate for moving the ribs into the grooves.

6. In a device for locking the steering wheel of a motor vehicle, the combination, of a supporting arm, a pair of plates secured to said arm, a U-shaped slidable bolt mounted in the plates for engaging the opposite sides of a spoke of the wheel and having grooves in the outer sides of the bolt, and means including a plurality of rotatable graduated rings having ribs on their inner surfaces for engaging the grooves of the bolt for retaining it in locking engagement with the spoke.

7. In a device for locking the steering wheel of a motor vehicle, the combination, of a supporting arm, a pair of plates secured to said arm, a U-shaped slidable bolt mounted in the plates for engaging the opposite sides of a spoke of the wheel, and means including a plurality of rotatable graduated rings for engaging the bolt for retaining it in locking engagement with the spoke, said bolt having grooves therein and said rings having ribs for engaging the grooves when the bolt is locked, and recesses in the rings designed to register with the grooves in the bolt to permit the bolt to be moved, as described.

8. In a locking device for the steering wheel of a motor vehicle, an arm, means for attaching the arm to the steering post, including a movable part, plates on the arm, means for securing the same together, said securing means being concealed and said movable part being retained in clamping place on the post when the plates are secured in place on the arm, means for locking the plates to the arm including posts attached to the arm and graduated rotatable rings on the plates having devices for engaging the posts.

9. In a locking device for the steering wheel of a motor vehicle, an arm, means for attaching the arm to the steering post in a laterally extending position, including a movable clamping part, upper and lower plates on the arm, means for securing the same together, said securing means being concealed by the arm and said movable part is retained in place by the plates when the plates are placed on the arm, means for attaching the plates to the arm including posts on the arm passing through one of the plates and into recesses in the upper plate and graduated rotatable rings on the plates having devices for engaging the posts, a slidable bolt for engaging a spoke of the wheel and said rings also having locking engagement with the bolt for retaining the bolt in engagement with a spoke of the wheel.

10. In a lock for the purpose described, the combination with a supporting arm, of upper and lower plates, a device for securing the plates together and passing through the lower plate and into the upper one, said securing device being concealed when the plates are assembled and placed on the arm, openings in the plates to receive a slidable bolt, a plurality of rotatable rings engaging the bolt for locking the bolt against movement, and for securing the plates to the arm.

11. A device for locking the steering wheel of a motor vehicle to prevent its operation and comprising a member designed for attachment to the steering post, a pair of pins attached to the member, plates on the member, means for attaching the plates together, revolvable graduated rings between the plates which engage the pins for detachably connecting the plates to the member, a slidable U-shaped bolt for engaging the opposite sides of a spoke of the steering wheel, said rings engaging the bolt to lock the same in contact with the spoke at the same time that it connects the plates to the member.

12. A locking device for the steering wheel of a motor vehicle comprising in combination, of a member designed for attachment to the steering post, a slidable U-shaped bolt for engaging the opposite sides of a spoke of the wheel and formed with kerfs on the limbs of the bolt, rotatable rings formed with spaced ribs on their inner edges for entering the kerfs, means for connecting the rings to the member, and the spaces between the ribs permitting the bolt to be moved away from the spokes.

13. In combination a supporting member, a stud on said member, a bolt extending through said member adjacent the stud, a plurality of rings supported upon the member and surrounding the stud and bolt, and having portions adapted in certain positions to engage and in other positions to disengage the stud and bolt, substantially as described.

14. In combination with device as set forth in claim 13, a member connected with the supporting member and retaining the rings in place, the bolt passing through said retaining member.

15. In combination, a supporting member, a pair of studs thereon, a bolt having a plurality of legs extending through said member adjacent the studs, a plurality of rings supported upon the member and surrounding the stud and bolt, said rings having portions adapted in certain positions of the rings to engage and in other positions to free the studs and bolt, substantially as described.

16. In combination with devices as set forth in claim 15, a top member connected with the base member and retaining the permutation rings in place, the legs of the bolt passing through said top member.

17. In combination, a supporting member, a pair of notched studs thereon, a U shaped bolt having its legs extended through said member adjacent the notched studs, a plurality of permutation rings supported upon the member and surrounding the studs and bolt, said permutation rings having interior portions adapted in certain positions to engage and in other positions to disengage the notches of the studs and bolt, substantially as described.

18. In combination with devices as set forth in claim 17, a top member connected with the base member and retaining the permutation rings in place, said top member being perforated for the passage of the legs of the bolt.

19. In combination, a supporting member having a recess adjacent one end and a recessed arm hinged to the recessed end of said member, and having a stud rising from its upper end; and said supporting member having a similar stud rising from its upper side, a bolt extending through said member adjacent the stud, a ring supported upon the member and surrounding the studs and bolt and holding the hinged arm in closed position, said ring having portions, adapted in certain position to engage and in other positions to disengage the studs and bolt, substantially as described.

20. In combination with devices as set forth in claim 19 a top member connected with the base member and retaining the rings in place, the bolt passing through said top member.

21. In a mechanism as set forth in claim 19, the studs and bolt being notched, and a plurality of rings having internal webs or flanges adapted to engage the notches of the studs and bolt, substantially as described.

22. In combination a supporting member having a recess adjacent one end, an arm hinged to the recessed end of the supporting member adapted to close the recess, said arm having a stud rising from its upper end, and said supporting member having a similar stud rising from its upper side, said studs being notched; a U shaped locking bolt having its legs extended through openings in said supporting member beside the studs, the legs of the bolt being notched; a plurality of rings supported upon the member and surrounding the said studs and the legs of the sliding bolt, and holding the hinged arm in closed position, said rings having internal webs or flanges adapted in certain positions of the rings to engage and in others to disengage the notches of the studs and bolt, substantially as described.

23. In combination with devices as set forth in claim 22, a top member connected with the base member and retaining the permutation rings in place, the legs of the bolt passing through said top member.

OTTO HERMANN.